Aug. 4, 1970   A. GROSSEAU   3,522,702
POST-COMBUSTION PURIFIER FOR THERMAL ENGINES
Filed Nov. 14, 1968   3 Sheets-Sheet 1
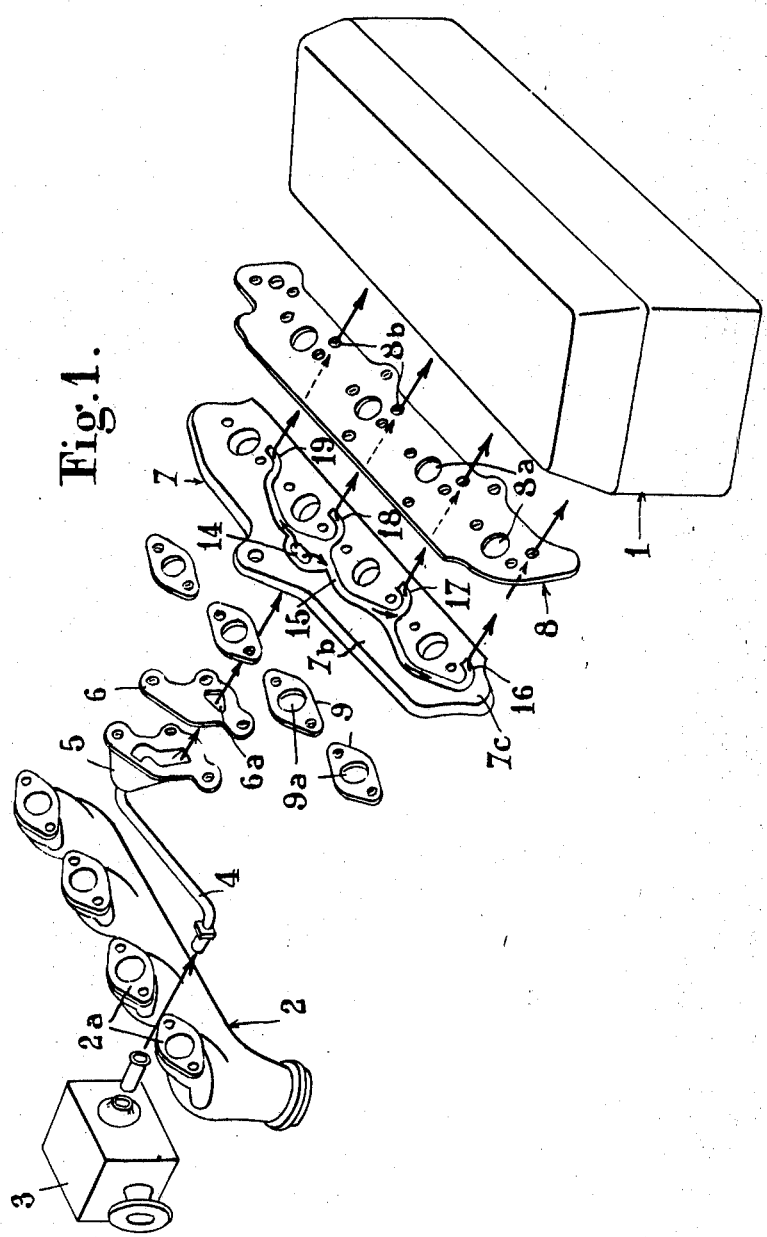

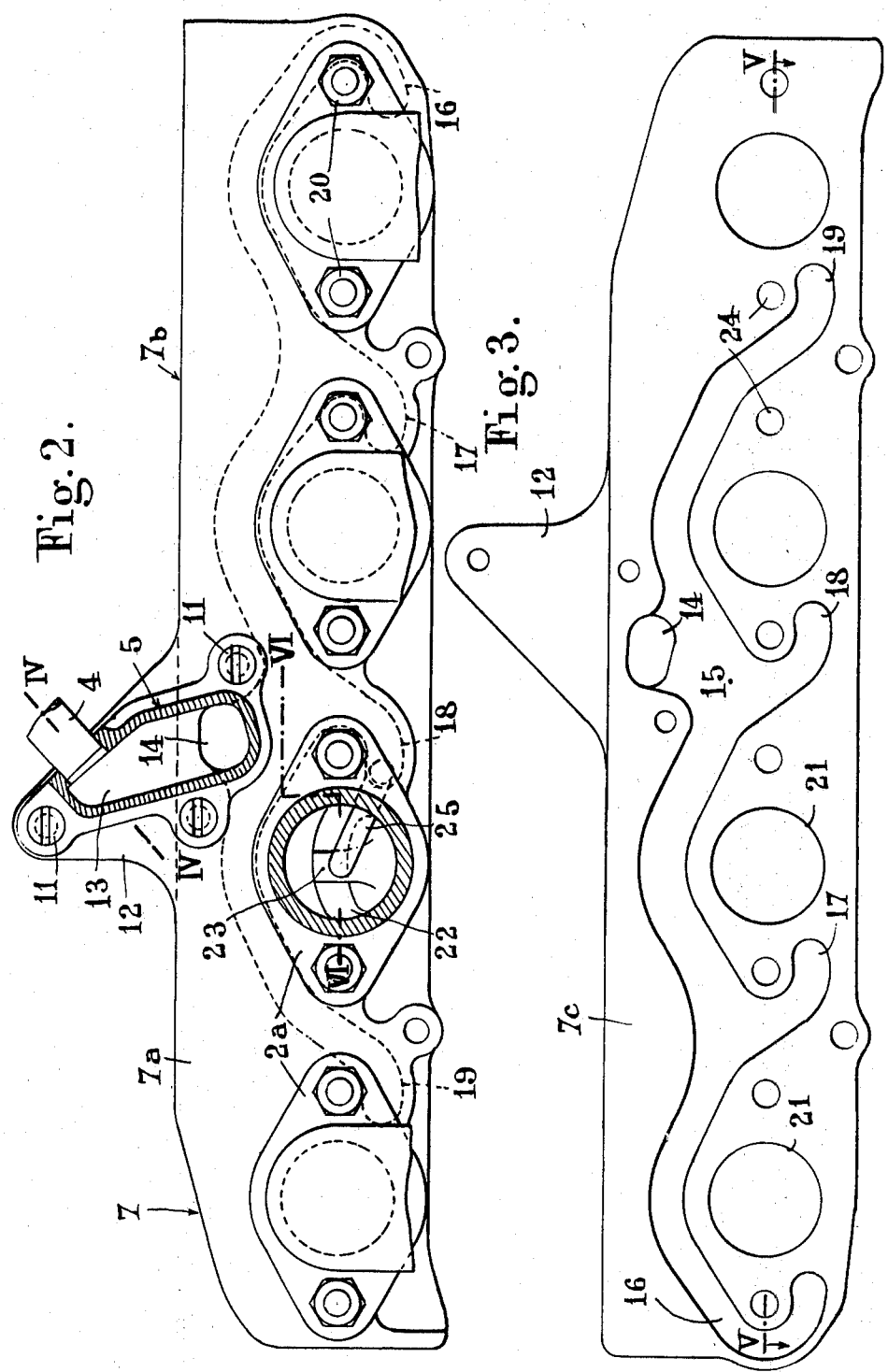

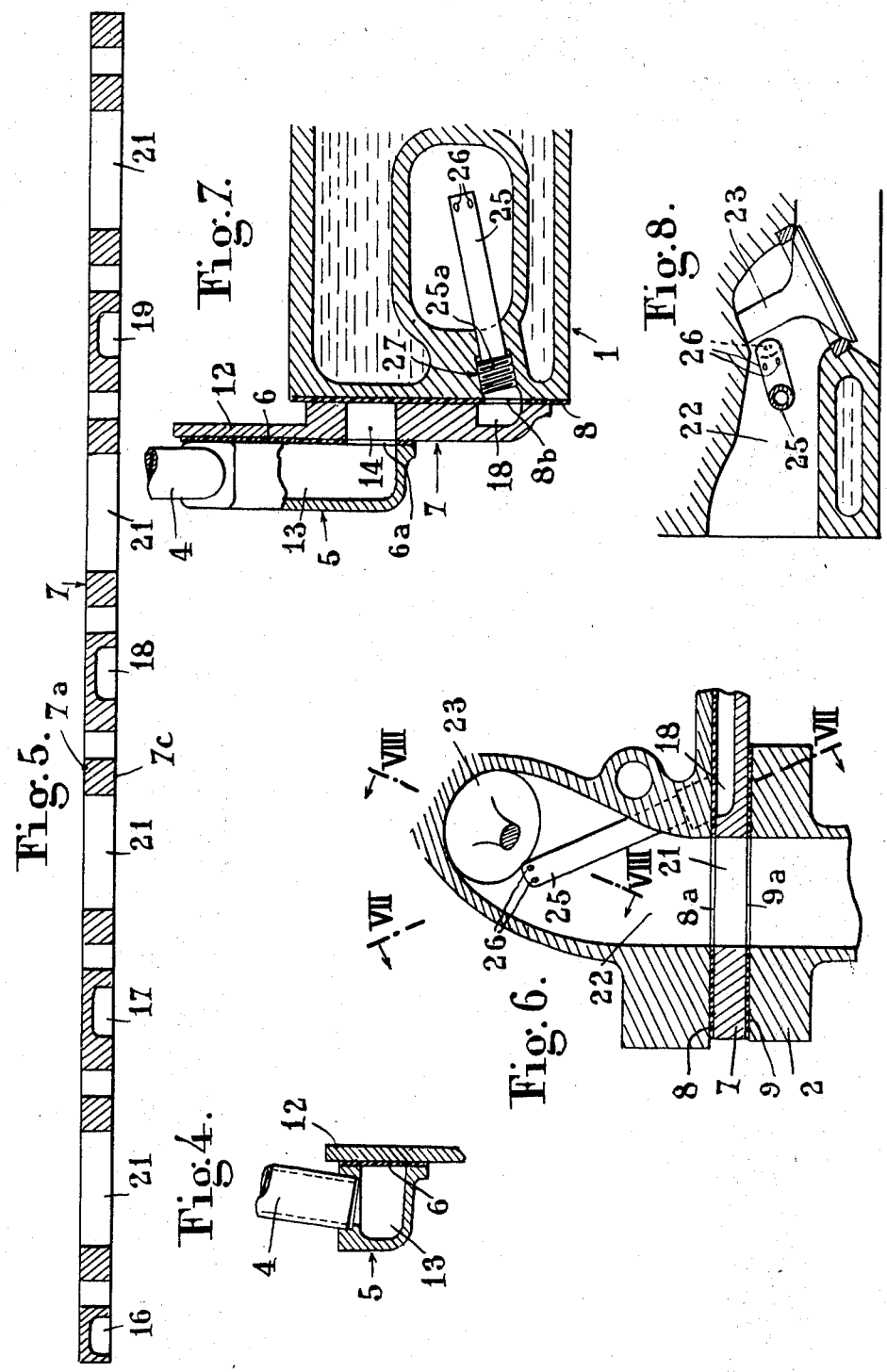

United States Patent Office 3,522,702
Patented Aug. 4, 1970

---

3,522,702
POST-COMBUSTION PURIFIER FOR THERMAL ENGINES
Albert Grosseau, Chaville, France, assignor to Societe Anonyme Automobiles Citroen, Paris, France
Filed Nov. 14, 1968, Ser. No. 775,604
Claims priority, application France, Nov. 17, 1967, 128,652
Int. Cl. F01n 3/10
U.S. Cl. 60—30       11 Claims

ABSTRACT OF THE DISCLOSURE

Post-combustion purifier for thermal engines, which comprises a secondary air pump connected through a supply pipeline to an air distributor communicating in turn with air injection pipes opening into the pockets of the engine exhaust valves respectively, characterized in that said air distributor consists of a flat plate secured with the interposition of sealing gaskets between the exhaust manifold and the cylinder-head, said air distributing plate having holes formed therethrough for the passage of exhaust gas, and secondary air-distributing ducts also formed in said plate, each secondary air-distributing duct communicating on the one hand with an air injection pipe housed completely in said cylinder-head and on the other hand with an air inlet orifice connected to said secondary air supply pipeline.

BACKGROUND OF THE INVENTION

The present invention relates to a post-combustion purifier for thermal engines, i.e., a device intended for avoiding the pollution of the atmosphere by the exhaust gas of these engines.

Various purifying devices are already known which are designed for injecting air into the pockets of the engine exhaust valve with a view to produce a complementary oxidation of the exhaust gas by transforming the carbon monoxide (CO) contents of the exhaust gas into carbon dioxide gas ($CO_2$). As a rule, hitherto known exhaust gas purifying devices comprise a secondary air pump, a pipeline directing this air to an external distributing pipe extending parallel to the engine cylinder block and provided with stainless steel branch pipe sections for injecting secondary air at the level of the exhaust ports.

Known purifying systems of this type are characterized by a number of inconveniences. In fact, they are relatively cumbersome, their cost is rather high due to the provision of relatively long pipes of stainless steel for injecting the secondary air, and in addition they are hardly adaptable to mass-produced engines.

SUMMARY OF THE INVENTION

It is the essential object of this invention to avoid these inconveniences by providing a device of particularly simple design.

To this end, the post-combustion purifier according to this invention for thermal engines, which comprises a secondary air pump connected through a supply pipeline to an air distributor communicating in turn with air injection pipes opening into the pockets of the engine exhaust valves, respectively, is characterized in that said air distributor consists of a flat plate secured with the interposition of sealing gaskets between the exhaust manifold and the cylinder head, said air distributing plate having holes formed therethrough for the passage of exhaust gas and seconardy air distributing ducts also formed in said plate, each secondary air distributing duct communicating on the one hand with an air injection pipe housed completely in said cylinder-head and on the other hand with an air inlet orifice connected to said secondary air supply pipe line.

According to complementary feature characterizing this invention, the various secondary air distributing ducts consist of passages formed in said air distributor, and all these passages communicate with a common port formed in air-distributor forming plate and through which the secondary air delivered by the pump penetrates into this distributor.

The ducts supplying the various engine cylinders may have different cross-sectional passage areas in order to supply secondary air to each exhaust valve as a function of the fuel supplied to the corresponding cylinder.

The purifier according to this invention is attended by a number of advantageous features.

Firstly, due to the flat configuration of the air distributor and to its intermediate position between the cylinder-head and the exhaust manifold, the mounting thereof is exteremely simple and the device can easily be adapted to a mass-produced engine. Besides, the overall dimensions of the device are extremely reduced and its manufacture is particularly simple since the secondary air distributing ducts can be obtained in the form of simple grooves formed in the distributor main face registering with the cylinder-head.

Only a very simple machining operating is required for the cylinder-head. In fact, simple tapped holes are used for fitting the air injection pipelines and no major modifications of the casting are required. A same cylinder-head can be used, whether the engine is equipped or not with the purifying device.

Thus air-injection pipe sections are relatively short thus affording considerable savings inasmuch as these sections are made of a relatively expensive material (stainless steel). The assembling of these relatively small-sized parts is thus facilitated and besides the shortness of the pipe sections eliminates undesired vibrations.

Finally, the device according to this invention permits of utilizing existing exhaust manifolds.

BRIEF DESCRIPTION OF THE DRAWINGS

A specific form of embodiment will now be described by way of example with reference to the accompanying drawing, in which:

FIG. 1 is an exploded perspective view showing a post-combustion purifier according to this invention, mounted on the cylinder-head of a thermal engine;

FIG. 2 is an elevational view showing on a larger scale with parts broken away a secondary air distributor mounted on the cylinder-head of a thermal engine, the exhaust manifold being shown only partially in this figure;

FIG. 3 is an elevational view of the air distributor as seen from the side registering with the cylinder-head;

FIG. 4 is a fragmentary section taken along the line IV—IV of FIG. 2;

FIG. 5 is a horizontal section taken along the line V—V of FIG. 3;

FIG. 6 is a fragmentary horizontal section taken along the line VI—VI of FIG. 2;

FIG. 7 is a vertical section taken along the line VII—VII of FIG. 6;

FIG. 8 is another vertical section taken along the line VIII—VIII of FIG. 6.

DESCRIPTION OF THE PREFERRED EMBODIMENT

Firstly, a general description of the purifying device according to this invention will be given with reference to FIG. 1. This purifying device is associated with a thermal engine illustrated diagrammatically by its cylinder-head 1 to which an exhaust manifold 2 is adapted to be secured.

Although a four-cylinder engine has been illustrated in the drawing, it will readily occur to those conversant with the art that the number of cylinders is immaterial as far as the principle of this invention is concerned.

This purifying device comprises a secondary air pump 3 driven from the engine and having its delivery port connected through a pipe 4 to an air inlet flange 5. This air inlet flange 5 is secured in turn, with the interposition of a sealing gasket 6 of same external contour and formed with a hole 6a, to an air distributor 7 consisting of a flat plate adapted to be secured in turn to the cylinder-head 1 with the interposition of another sealing gasket 8 in which apertures 8a for the passage of the exhaust gas and apertures 8b for the passage of said secondary air are formed.

The air distributor 7 is adapted to be secured to the cylinder-head 1 by means of studs also adapted to secure the exhaust manifold 2 thereto. Sealing gaskets 9 formed with apertures 9a are interposed between each flange 2a of exhaust manifold 2 and the air distributor 7.

From the foregoing it will be seen that the air distributor 7 is inserted between the exhaust manifold 2 and the cylinder-head 1, and secured to this cylinder-head by using the same fastening studs as those usually provided for securing the exhaust manifold 2.

Now the secondary air distributor will be described more in detail with reference notably to FIGS. 2 to 5 inclusive of the drawing.

The air inlet flange 5, to which the secondary air feed pipe 4 is welded, is secured by means of screws 11 to the central upper portion of the outer face 7a, i.e., the face directed towards the exhaust manifold 2, of distributor 7. To this end, the upper face 7b of distributor 7 has an upward extension in the form of a boss 12 to which the air inlet flange 5 is partially secured. This air inlet flange comprises a shell-like portion forming with the sealing gasket 6 pressed against the vertical outer face 7a of said air distributor an inlet chamber 13 into which opens the outlet end of said secondary air pipe 4.

The air inlet flange 5 fits over an inlet port 14 formed through the air-distributor forming plate 7; registering with this port 14 is an aperture 6a of same configuration formed in the sealing gasket 6.

On its inner face 7c, i.e., the face registering with, and engaging, the cylinder-head 1, the distributor 7 has formed therein a distributing groove communicating with said inlet port 14. This groove 15 as shown is formed in said face 7a and its configuration takes due consideration for the various fastening holes. Branch grooves 16, 17, 18 and 19 extend from said common groove 15 for supplying secondary air to the injection pipes associated with the four engine cylinders.

The air distributor 7 is also provided with four through holes 21 registering with the pockets 22 of the engine exhaust valves 23, and also with holes 9a formed through the sealing gaskets 9 disposed between the air distributor 7 and the exhaust manifold flanges 2a. Each hole 21 of relatively large diameter has formed on either side a pair of smaller holes 24 through which the studs 20 for fastening the exhaust manifold 2 and air distributor 7 to the cylinder-head 1 can be inserted.

As can be best seen in FIGS. 6 to 8 of the drawing a secondary air injection pipe 25 projects into each pocket 22 of exhaust valves 23. Each secondary air injection pipe 25 has small orifices 26 formed through its outlet end so as to direct in this pocket 22 the secondary air towards a suitably selected point located in close vicinity of the shank of exhaust valve 23.

Each air injection pipe 25 may consist of a unitary member formed by screw-cutting, as shown in FIG. 7. In this case the pipe 25 comprises an integral screw-threaded head 25a engaging a tapped hole 27 formed in the cylinder-head 1.

According to a modified form of embodiment not shown, the air injection pipe 25 may be force-fitted into a screw-threaded insert screwed in this tapped hole 27.

As clearly shown in FIG. 7, the outlet end of branch groove 18 in air distributor 7 registers with the hole 27 in which the air injection pipe 25 is screwed, and also with a hole 8b formed at this location through the sealing gasket 8 between the air distributor 7 and the engine cylinder-head 1.

From the foregoing, it will be seen that the secondary air forced by the pump 3 into the pipe 4 penetrates into the air distributor 7 through the inlet port 14 and is subsequently distributed via the common groove 15 to the branch grooves 16 to 19, so that it eventually enters the various air injection pipes 25.

The overall dimensions of the above-described device are particularly reduced, due to the flat configuration of the air distributor 7, and on the other hand the manufacture of this distributor is extremely simple inasmuch as the air distributing duct consists of a simple groove. The necessary machining of the cylinder-head is also simple since it is only necessary to provide tapped holes 27 for fitting the air injection pipes 25. The cylinder-head casting is not appreciably modified and this casting is the same, whether the cylinder-head is equipped or not with the purifying device according to this invention.

Finally, in FIGS. 6 to 8 it will be seen that air injection pipes 25 are relatively short, thus affording appreciable savings of a costly material (stainless steel) while avoiding undesired vibration.

Besides, it will be clearly apparent to anybody conversant with the art that the specific and preferred form of embodiment described hereinabove with reference to the accompanying drawing should not be construed as limiting the invention since many modifications can be brought thereto without departing from the spirit and scope of the invention as set forth in the appended claims.

Although the air distributor 7 has been described and illustrated as comprising a groove pattern formed in the face thereof which registers with the cylinder-head, it will readily occur to those skilled in the art that such distributing grooves could also be formed within the mass of the distributor by any suitable and known process (e.g., machining, lost-wax moulding process, using a separate machined plate assembled with the main plate, etc.).

Finally, the grooves feeding the various engine cylinders may have different cross-sectional dimensions in order to deliver secondary air to each exhaust valve as a function of the quantity of fuel delivered to the relevant cylinder.

What I claim is:

1. A post-combustion exhaust-gas purifier for thermal engine comprising a cylinder-head, an exhaust manifold connected to said cylinder-head, valve pockets formed in said cylinder-head, exhaust valves housed in said pockets respectively, air injection pipes opening into said exhaust-valve pockets respectively, a secondary air pump, a flat plate constituting an air distributor which is secured between said exhaust manifold and said cylinderhead, holes formed in said air-distributor forming plate for the passage of the engine exhaust gas, an air inlet port formed through said air-distributor forming plate and communicating with said secondary air pump, and secondary air distributing ducts formed in said plate and each adapted to communicate on the one hand with an air injection pipe opening into the pocket of an exhaust valve of said engine, and on the other hand with said air inlet port.

2. A purifier as set forth in claim 1, wherein said secondary air distributing ducts are formed in the thickness of said air distributor forming flat plate and the branch portions of said ducts communicate, on the plate face directed towards the cylinder-head with the inlet end of said air injection pipes secured in said cylinderhead.

3. A purifier as set forth in claim 1, wherein said secondary air distributing ducts consists of grooves formed in that face of said air distributor forming plate which is directed towards said cylinder-head, the branch sections of said grooves leading into the inlet ends of said air injection pipes secured in said cylinderhead.

4. A purifier as set forth in claim 1, which comprises a secondary air supply pipeline connecting said secondary air pump to said air distributor forming flat plate, and an air inlet flange secured to that face of said air-distributor forming plate which is directed towards said exhaust manifold, said flange covering the air inlet port formed trough said plate and forming a chamber into which opens said secondary air supply pipe line.

5. A purifier as set forth in claim 4, which comprises a first sealing gasket interposed between said air inlet flange and said air-distributor forming plate, and a hole formed through said first sealing gasket and corresponding in shape to said air inlet port.

6. A purifier as set forth in claim 1, which comprises a second sealing gasket disposed between said air-distributor forming flat plate and said cylinderhead, holes of relatively large diameter formed in said second sealing gasket for the passage of the exhaust gas and other holes but of relatively small diameter formed in said second sealing gasket for the passage of said secondary air.

7. A purifier as set forth in claim 1, which comprises third sealing gaskets disposed between said exhaust manifold and said air-distributor forming plate, and holes formed through said third sealing gaskets for permitting the passage of the exhaust gas.

8. A purifier as set forth in claim 1, which comprises members for concurrently securing said exhaust manifold and said air-distributor forming flat plate to said cylinderhead.

9. A purifier as set forth in claim 1, which comprises, in said cylinder-head, tapped holes and screw-threaded heads solid respectively with said air injection pipes and screwed in said tapped holes.

10. A purifier as set forth in claim 1, which comprises relatively small holes formed through the outlet end of each air injection pipe which is located near the exhaust valve port in said cylinder-head.

11. A purifier as set forth in claim 1, wherein said secondary air distributing ducts have different cross-sectional passage areas.

References Cited
UNITED STATES PATENTS

| | | | |
|---|---|---|---|
| 939,844 | 11/1909 | Lehmann | 60—30 |
| 2,217,241 | 10/1940 | Tendler | 60—30 |
| 2,263,318 | 11/1941 | Tifft | 60—30 |
| 2,295,436 | 9/1942 | Tendler | 60—30 |
| 3,147,588 | 9/1964 | Tauschek | 60—30 |

CARLTON R. CROYLE, Primary Examiner

D. HART, Assistant Examiner